Dec. 24, 1968     E. W. PENTON     3,417,895
AUXILIARY CONTAINER
Original Filed March 14, 1966
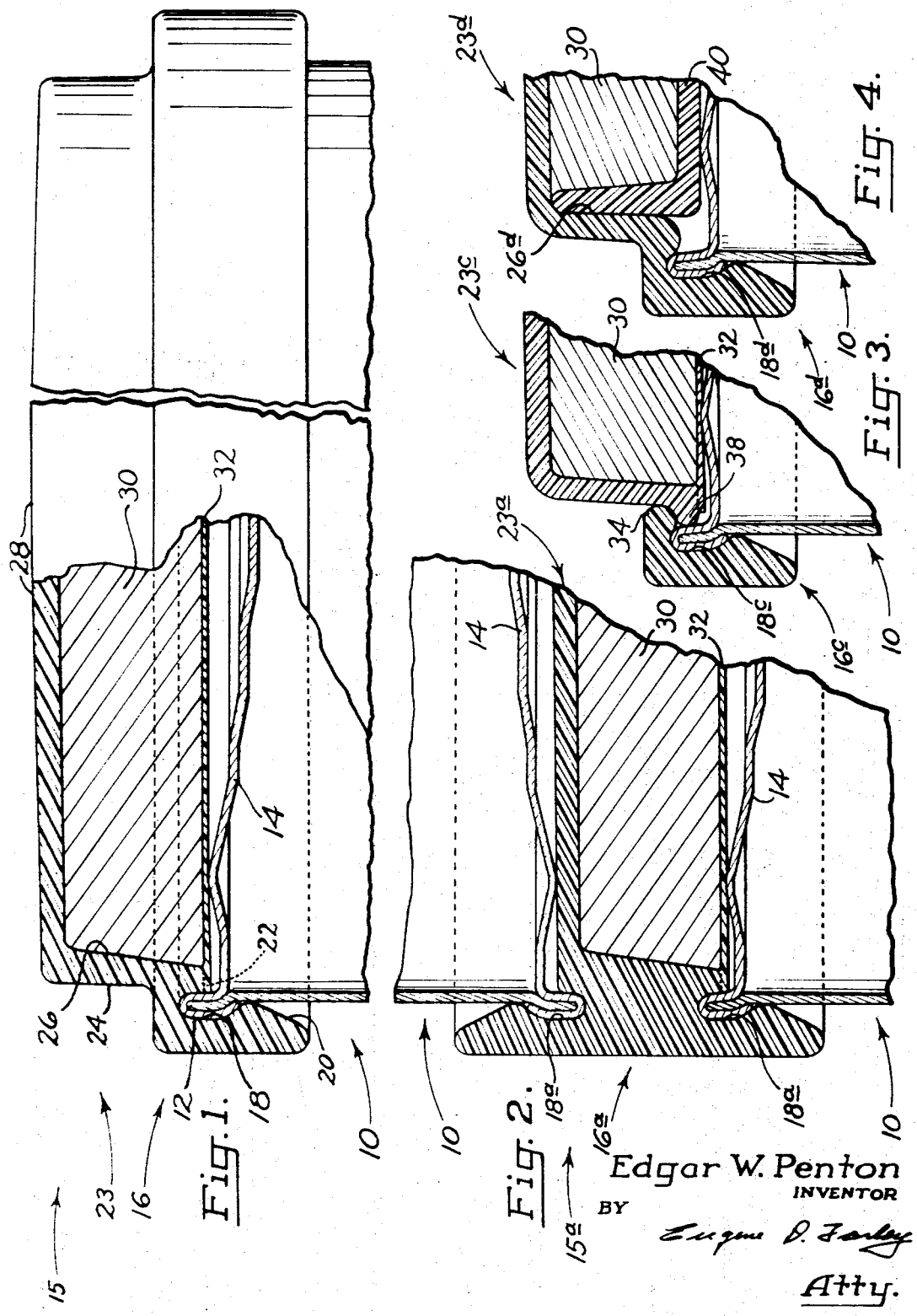
Edgar W. Penton
INVENTOR
BY
Eugene D. Farley
Atty.

United States Patent Office 3,417,895
Patented Dec. 24, 1968

3,417,895
AUXILIARY CONTAINER
Edgar W. Penton, 702 W. Main St.,
Auburn, Wash. 98002
Continuation of application Ser. No. 533,962, Mar. 14, 1966. This application Dec. 1, 1967, Ser. No. 687,908
7 Claims. (Cl. 220—23)

ABSTRACT OF THE DISCLOSURE

An annular base member of synthetic thermoplastic material has an internal groove adapted to recieve the flanged periphery of a can-type container releasably to secure the base member and container together. In one embodiment the base member is integral with an auxiliary container. In another embodiment the base member is separate from an auxiliary container and has a flange adapted to overlie a flange on the auxiliary container to secure the latter to the can-type container. In still another embodiment the base member is integral with a dome in which an auxiliary container is removably confined.

---

This invention is a continuation application Ser. No. 533,962 filed Mar. 14, 1966 and now abandoned and relates to auxiliary containers containing a given product and adapted to be fixed releasably as caps to primary containers holding a related product.

The invention pertains particularly to recessed semi-rigid auxiliary containers containing food sauces and adapted to be fixed as caps to the ends of can-type or other rigid containers containing foods with which the sauces are to be used. The invention is described herein with particular reference to such use, although no limitation thereby is intended, since the invention also may be used in packaging pigments to be used with paints, and in many other applications.

With the advent of the so-called "convenience" foods, it has become common practice to distribute food sauces or sauce concentrates either as independent products in envelopes, bags, and boxes, or by packing them in secondary containers inside the main container holding the food with which the sauces are to be used. This is true of frozen foods, as well as of foods which are sold in their normal condition.

The prospect of associating sauces and sauce concentrates with primary food products contained in metal and plastic containers is of particular interest, since a large proportion of all canned products are used some of the time or all of the time with sauces of one kind or another. Thus the canned products may be incorporated in creamed dishes, ala kings, Newbergs, casseroles and soups, as well as in dressings, toppings and gravies, all prepared by a variety of recipes.

It is the general purpose of this invention to provide an auxiliary container which may be releasably secured as a cap to the end of a can-type or plastic container and used to contain a sauce concentrate which is to be used with the contents of the latter, thereby facilitating the marketing and use of such products.

Other objects of the present invention are:

(1) The provision of a container for a sauce or sauce concentrate which will preserve the sauce or sauce concentrate in a clean and essentially sterile condition whether attached to the primary container or removed from it for future use.

(2) The provision of a container for sauce or sauce concentrates which may be used as a lid for the primary container to which it is attached after the latter has been opened.

(3) The provision of a container assembly including a sauce cap, which assembly may be stacked on other like assemblies without injury to the assemblies or their contents.

(4) The provision of a container for a sauce or sauce concentrate in the form of a brittle cake which may be cast in the container and subsequently easily removed therefrom.

(5) The provision of a container which is adaptable for the reception of a wide variety of sauces or sauce concentrates in diverse conditions, as in cake, paste, powder, or aggregate form.

(6) The provision of a container for sauce or sauce concentrates which may be employed also to hold in juxtaposition a pair of primary food containers in piggyback relation.

Broadly stated, the auxiliary container having the foregoing desirable characteristics comprises a base of semi-rigid, container-forming materials such as polyethylene or other semi-rigid plastic. The base is dimensioned to telescope over the flanged end of a metal can or other rigid primary container holding a first product. Releasable securing means are present on the base for securing it to the can.

A dome is formed integrally with the base, being dimensioned to provide a recess or cavity between the top of the dome and the top of the primary container. The recess has a capacity sufficient to contain a predetermined quantity of a second product, particularly a food sauce in the form of a cake adapted to be used with a primary food product contained in the first container.

Thus in use the primary food product in the can may be sold directly associated with the sauce in the dome-shaped cap affixed to the can. When the food is prepared, the cap is removed from the can and its contents used to make a sauce for the food contained in the can. Also, if desired, the auxiliary container may be used as a cap for the opened can if the latter is to be used subsequently as a storage container.

Considering the foregoing in greater detail and with particular reference to the drawings, wherein:

FIG. 1 is a foreshortened view in elevation, partly in section, of a primary receptacle, i.e. a rigid metal can, with the herein described auxiliary container mounted thereon;

FIG. 2 is a fragmentary view in vertical section, similar to FIG. 1, but illustrating the auxiliary container of the invention employed with two primary containers arranged end to end; and FIGS. 3 and 4 are fragmentary views in vertical section illustrating respectively the herein described auxiliary container in two of its alternate forms.

As has been indicated above, the auxiliary containers of the invention are fabricated from a semi-rigid, container-forming material. By this is meant a material, in contrast to paper or cloth, will retain its predetermined form.

On the other hand, the material is somewhat flexible so that it may function in the desired manner. The containers thus may be fabricated to advantage by molding them from a suitable inert plastic material such as polyethylene.

In the FIG. 1 form of the invention the auxiliary container is illustrated attached to the end of a conventional can-type container indicated at 10. As is usual, the container is formed with an upstanding peripheral flange 12 at each end. It also is provided with a lid 14 of inwardly dished, stepped configuration.

The auxiliary container 15 mounted on the primary container includes an annular base 16 having a diameter somewhat larger than the diameter of can 10. The base is secured releasably to the end of the can through the agency of an internal annular recess 18 dimensioned to receive flange 12 of the can in frictional engagement.

Base 16 also is provided with a downwardly extending skirt 20 which extends down along the side wall of the primary container or can. The interior surface of the skirt preferably is inwardly beveled in the manner indicated to facilitate entry of the can into recess 18.

Base 16 also is provided with an inner annular shoulder 22 designed to fit inside flange 12 and having a planar surface which is substantially parallel to the planar face of the segment of can top 14 immediately opposite.

Extending outwardly from base 16 and perferably formed integrally therewith is a dome 23 which provides a receptacle of the desired capacity. The dome is characterized by several features of significance.

The outer surface 24 of its side wall has a diameter which is substantially equal to, or slightly less than, the inside diameter of flange 12 of the primary container. Thus the assemblies may be stacked one upon the other in mutually supporting relation, the bottom flange of the primary container above seating over the exterior surface of the side wall 24 of the auxiliary container immediately below.

Inner side wall 26 of the dome tapers inwardly, thus facilitating the removal of caked material which may be contained therein.

Top 28 of the dome is outwardly convex, further facilitating the removal of the material contained in the dome. This effect is evident when it is considered that if the material in the dome comprises a brittle cake of food sauce or other material, after removal of the auxiliary container the dome may be pressed centrally, popping the cake cleanly out of the containers, immediately available for use.

Thus, in its application the auxiliary container of FIG. 1 may be filled with a material 30 such as a sauce or sauce concentrate for use together with the contents of can 10 in the preparation of creamed dishes, casseroles ala kings, etc. Advantageously the sauce may be manufactured in a form which is molten and pourable at elevated temperatures but which solidifies to cake form at room temperatures.

Where this is the case, the molten sauce may be poured into the auxiliary container and allowed to solidify. Thereafter a protective sheet 32 may be applied to the surface of the sauce. Although this sheet may comprise metal foil, or treated paper, it preferably comprises a sheet of the same thermoplastic material employed in the manufacture of the auxiliary container.

The diameter of the sheet is such that it underlies planar surface 22 of the internal shoulder on body 16 of the container. By the application of a hot ring of proper diameter, the margins of the sheet may be fused with the body of the container, thereby forming an integral seal of particular effectiveness. The filled auxiliary container 15 then may be snapped as a cap over the end of the primary container 10.

The resulting assembly of primary container and superimposed auxiliary container may be stored and merchandised in the usual manner. When it is to be used, the auxiliary container is slipped off the end of the primary container. The latter is opened and its contents removed. Seal sheet 32 is stripped from the surface of the auxiliary container and its contents removed. As indicated above, where the contents comprise a solid cake, the cake may be ejected from the container simply by pressing the central portion of the upper flexible surface 28 of dome 23.

The dish indicated by the contents of the two containers then may be prepared. If it is desired later to use can 10 as a storage receptacle, the empty auxiliary container may be pressed over the open end of the can in which case it serves as a closure cap.

The embodiment of FIG. 2 is similar to that above described with the exception that it provides a means for associating two primary containers with a single auxiliary container. This might be desired, for example, where one of the primary containers contains tuna fish, the other primary container contains peas and the intermediate auxiliary container contains a cream sauce.

In this piggy-back construction a cap 15a has a duplex base 16a of relatively massive construction. The base is formed with diametrically opposed internal annular recesses 18a. These are designed to receive primary containers 10 respectively in releasable frictional engagement.

In this construction the substance of base 16a may be extended to provide the complete side wall of the dome 23a.

In other respects, the construction and function of the other parts of the auxiliary container, and its manner of use are similar to that above described. When it is desired to use the assembly, both primary containers 10 are removed from the connecting cap. All three containers then are opened and their contents blended in the manner indicated for the preparation of the desired product.

In the FIG. 3 form of the invention, the auxiliary container has a two-piece construction in which the dome section containing the contents is separatable from the supporting base. This arrangement may be of advantage in certain applications.

A base 16c is formed with an interior annular recess 18c dimensioned to receive in frictional engagement the flange of primary receptacle 10, in the manner previously set forth. In addition, however, the upper inner part of the base is formed with an inwardly extending bead 34.

A separate dome section 23c of the desired dimension is formed with a cooperating outwardly extending annular flange 38 on its lower, outer margin.

In the application of this form of the invention, dome element 23c is filled with the sauce or other product. Sealing sheet 32 is applied. Base 16c then is slipped over the dome and snapped over the end of container 10. This locks the three parts together pending their ultimate separation and use.

The embodiment of FIG. 4 illustrates still another type of a two part auxiliary container which also has special application.

In this embodiment a base 16d is formed with internal annular recess 18d adapted for a press fit over flange 12 of primary container 10 in the manner above described. However, the dome 23d is modified to receive a separate cup-shaped receptacle 40 dimensioned to contain the desired amount of product 30.

To this end the inner side wall 26d of the dome is tapered and contoured to receive the side wall of cup 40 in a press fit. In other respects the construction and arrangement and function of the parts is similar to that set forth in connection with FIG. 1.

In the use of the form of the invention shown in FIG. 4, cup 40 is filled with food sauce or other product 30. It then is pressed into the recess of the dome attached to base 16d the latter being inverted with respect to the cup. This seals the contents of the cup within the dome, eliminating the necessity of a sealing sheet such as sheet 32 of the previously described embodiments.

The cap assembly then is snapped over the top of primary container 10 where it is releasably held in place pending its subsequent use.

It accordingly will be seen that there is provided an apparatus in which the several objects of this invention are achieved and which is well adapted for the conditions of practical use.

Having thus described my invention, I claim:

1. For use with a sealed, can-type first container provided with top and bottom longitudinally projecting peripheral flanges and adapted to contain a first product, an auxiliary container for holding a second product, the auxiliary container comprising (a) a base of semi-rigid, container-forming material, (b) friction securing means on the base for releasably securing the same to the top flange of the first container as a cap thereto, and (c) a dome formed integrally with the base, (d) the top of the dome being spaced from the top of the first container to form a recess having the capacity sufficient to contain a predetermined quantity of a second product, (e) the dome having an outer periphery slightly smaller than the inner periphery of the first container flanges for stacking another first container atop the dome of an underlying auxiliary container.

2. The auxiliary container of claim 1 wherein the dome has an inwardly tapering inner side wall.

3. The auxiliary container of claim 1 wherein the dome has an outwardly convex top.

4. The auxiliary container of claim 1 wherein the dome has an inwardly tapering inner side wall and an outwardly convex top.

5. The auxiliary container of claim 1 wherein the base is provided with a downwardly extending skirt, the inside of the skirt having a tapered guiding surface.

6. The auxiliary container of claim 1 including a separate cup-shaped receptacle dimensioned for inverse reception within the dome, with the outer side walls of the receptacle in frictional engagement with the inner planar side walls of the dome.

7. For use with a sealed, can-type first container provided with an upstanding peripheral flange around one end and adapated to contain a first product, an auxiliary container for holding a second product, the auxiliary container comprising (a) a base of semi-rigid, container-forming material, (b) friction securing means on the base for releasably securing the same to the flange of the first container as a cap thereto, (c) a dome formed integrally with the base, (d) the top of the dome being spaced from the top of the first container to form a recess having the capacity sufficient to contain a predetermined quantity of a second product, (e) and second securing means arranged on the base in a direction opposite to the first securing means and adapted to receive a second rigid container, end to end with the first rigid container, one on either side of the dome.

References Cited
UNITED STATES PATENTS 3,310,195   3/1967   Wagner et al. _____ 220—23.83

JAMES B. MARBERT, *Primary Examiner.*

U.S. Cl. X.R.

220—23.83